W. McIntosh,
Mower.
No. 2529
33.533
Patented Oct. 22, 1861
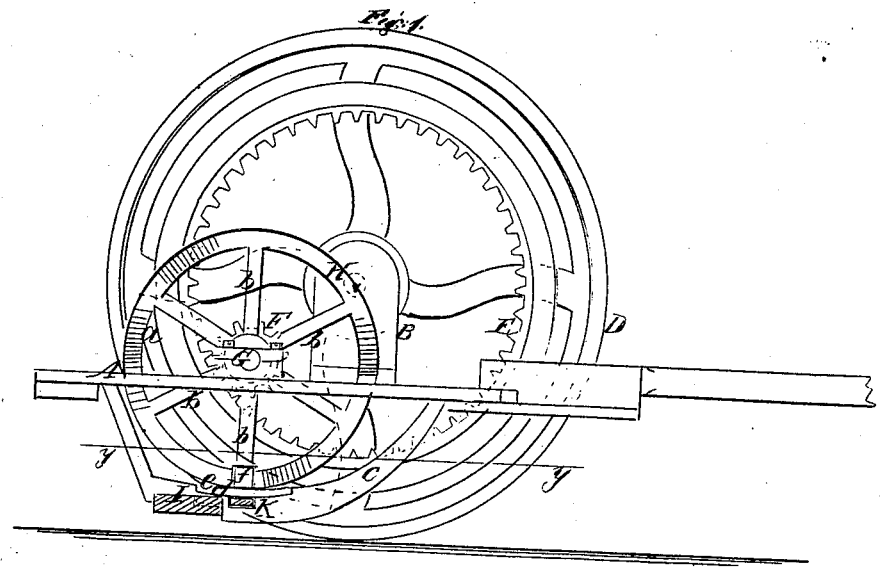
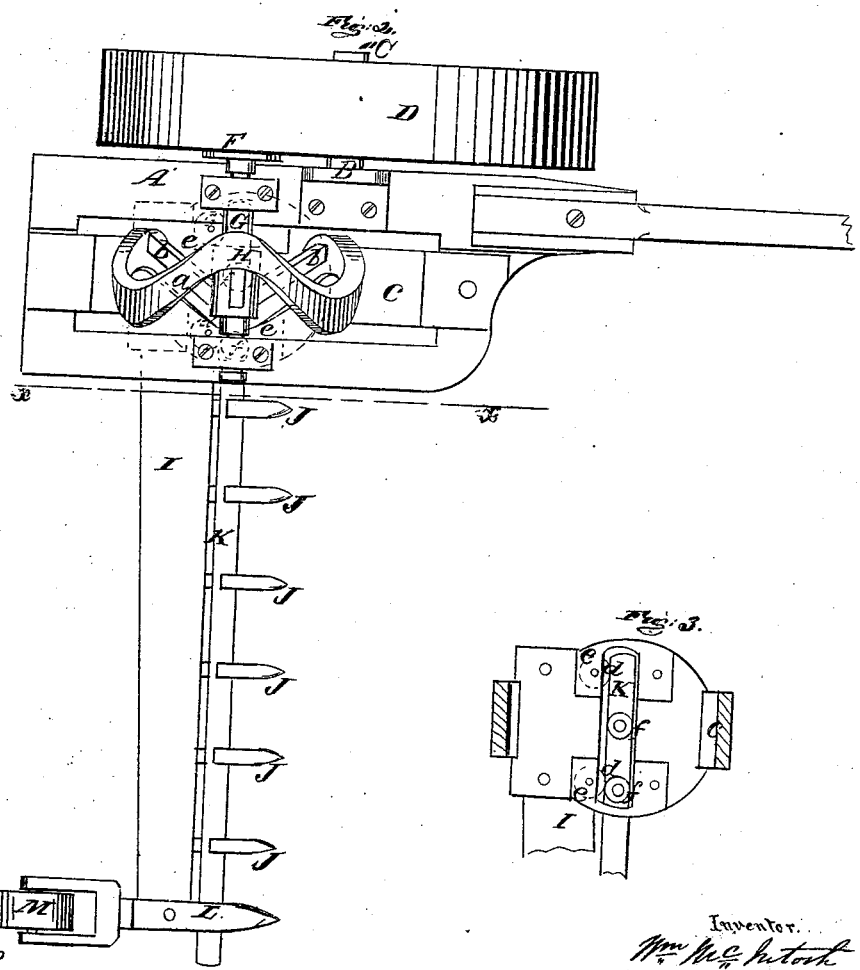
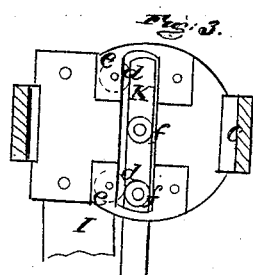
Witnesses.
Inventor.
Wm. McIntosh
by Munn & Co.
att'ys

UNITED STATES PATENT OFFICE.

WILLIAM McINTOSH, OF WILMINGTON, ILLINOIS.

IMPROVEMENT IN HARVESTERS.

Specification forming part of Letters Patent No. 33,533, dated October 22, 1861.

*To all whom it may concern:*

Be it known that I, WILLIAM MCINTOSH, of Wilmington, in the county of Will and State of Illinois, have invented a new and useful Improvement in Grain and Grass Harvesters; and I do hereby declare that the following is a full, clear, and exact description of the same, reference being had to the annexed drawings, making a part of this specification, in which—

Figure 1 is a transverse vertical section of my invention, taken in the line $x\ x$ of Fig. 2; Fig. 2, a plan or top view of the same; and Fig. 3 an enlarged plan sectional view of the main frame of the same, taken in the line $y\ y$ of Fig. 1.

Similar letters of reference indicate corresponding parts in the several figures.

To enable those skilled in the art to fully understand and construct my invention, I will proceed to describe it.

A represents the main frame of a harvester, having an upright, B, at its left-hand side, to the upper part of which the arm or axle C of the driving-wheel D is placed. This driving-wheel has a concentric toothed rim, E, attached, and into this rim E a pinion, F, gears, said pinion being on the outer end of a shaft, G, which is placed on the frame A and fitted in suitable bearings attached thereto. The shaft G has a zigzag or serpentine cam, H, upon it. The form of this cam is shown clearly in Fig. 2. It may be constructed of a zigzag rim, $a$, supported by spokes $b$.

I is the finger-bar, which may be of metal and attached at one end to a curved bar, $c$, which forms a part of the main frame A, and projects down sufficiently below it to bring the finger-bar quite close to the surface of the ground. The finger-bar I is provided with the usual fingers, J, in which the sickle K works, and is allowed to slide freely back and forth, and the outer end of the finger-bar is provided with a shoe, L, which has a wheel, M, at its back part. The inner part of the sickle K is fitted and works within a groove in the lower part of the curved bar $c$ of the main frame A, and the back edge of the sickle, at its inner part, bears against rollers $d\ d$, which are fitted in the bar $c$ and secured therein by caps or plates $e$, as shown clearly in Fig. 3.

To the upper surface of the sickle K, at its inner part, there are attached two friction-rollers, $f\ f$, between which the serpentine or zigzag rim $a$ of the cam H works. The cam H, which is rotated in consequence of the pinion F of shaft G gearing into the rim E of wheel D, gives a reciprocating movement to the sickle K, while the friction-rollers $d\ d$, against which the inner part of the sickle K bears, greatly reduce friction and insure an easy running movement of the sickle, said rollers $d\ d$ receiving the pressure of the sickle produced by the action of the cam H.

I do not claim, separately, the employment or use of friction-rollers for the cutter-bar to bear against, for they have been previously used; but,

Having thus described my invention, what I claim as new, and desire to secure by Letters Patent, is—

In combination with the serpentine cam H and rollers $f\ f$, or their equivalents, the rollers $d\ d$, placed in the bar $c$ of the main frame A, and arranged relatively with the sickle K, so as to serve as bearings for its back edge behind the cam H, as shown and described.

WM. McINTOSH.

Witnesses:
R. C. THOMPSON,
JAMES L. YOUNG.